2,513,670

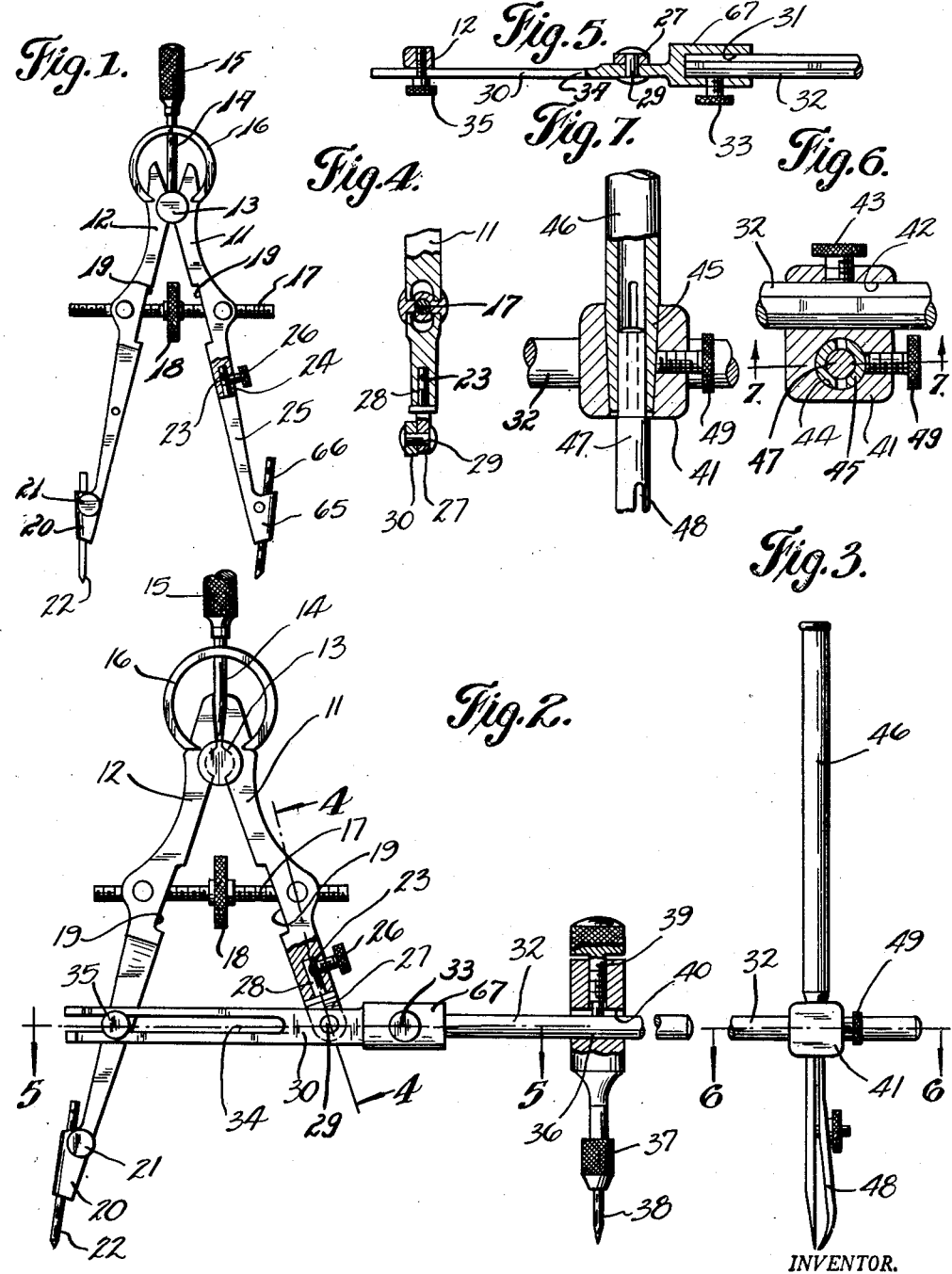
July 4, 1950 — G. PENZA — 2,513,670
BEAM COMPASS
Filed Dec. 6, 1946
INVENTOR.
GEORGE PENZA
BY
ATTORNEY Patented July 4, 1950

UNITED STATES PATENT OFFICE 2,513,670

BEAM COMPASS

George Penza, Detroit, Mich.

Application December 6, 1946, Serial No. 714,354

3 Claims. (Cl. 33—160)

1

My invention relates to a new and useful improvement in a compass adapted for a variety of uses, among which is the use of a beam compass.

It is an object of the present invention to provide a compass which will be simple in structure, economical of manufacture, durable, compact, light, highly efficient in use, and easily and quickly adapted for use for various purposes.

It is another object of the present invention to provide a compass so constructed and arranged that it may be easily and quickly adapted for use as a beam compass and when so arranged, it will be rigid and accurate.

It is another object of the invention to provide a compass so arranged and constructed that it may be used as an ordinary compass, as a scribe compass, or a beam compass, and when used as a scribe or beam compass will be provided with micrometer adjustments, while at the same time, the structure will be secured so that there will be no play or distortion of the device when in use.

Another object of the invention is the provision of a compass so arranged and constructed that when used as a beam compass means in addition to the adjustment screw will be provided for retaining the structure in rigid formation.

Another object of the invention is the provision of a compass which may be easily adapted for use as a beam compass and when so adapted may be rotated with an operator's single hand, thus, eliminating the necessity of the use of both hands.

Other objects will appear hereinafter.

It is recognized that various modifications and changes may be made in the detail of structure illustrated, without departing from the invention and it is intended that such shall be embraced within the scope of the claims which form a part hereof.

Forming a part of this specification are drawings in which,

Fig. 1 is a side elevational view of the invention,

Fig. 2 is a side elevational view of the invention with parts broken away and parts shown in section illustrating the invention adapted for use as a beam compass, Fig. 3 is a fragmentary side elevational view of the invention when used as a beam compass with a pen, Fig. 4 is a fragmentary, sectional view taken on line 4—4 of Fig. 2, Fig. 5 is a fragmentary, sectional view taken on line 5—5 of Fig. 2, Fig. 6 is a sectional view taken on line 6—6 of Fig. 3 slightly enlarged,

2

Fig. 7 is a sectional view taken on line 7—7 of Fig. 6.

In the drawings, I have illustrated the compass as embodying a pair of legs 11 and 12 which are swingably mounted on a pivot 13 which is attached to the stem 14 having the finger-grip 15. The stem 14 projects through the bow spring 16 which normally tends to urge the legs into relative approach. Threaded through the legs 11 and 12 is the adjusting screw 17 having the knob 18 mounted thereon whereby the screw 17 may be rotated. Each of the legs is provided on its inner face with a recess 18 for accommodating the knob 18 when the legs are in fully closed position. The leg 12 is provided with a split sleeve 20 which may be moved by the screw 21 into clamping relation on a lead 22 or other suitable device in a well known manner.

The leg 11 is formed shorter than the leg 12 and is provided at its end with a socket 23 for the reception of a stud 24 which projects upwardly from the leg extension 25 and against which is threaded the set screw 26. The leg extension 25 is provided with a split sleeve 65 adapted for receiving a lead 66. In the form shown in Fig. 1, the construction would be used as an ordinary compass. It is believed obvious that either one of the leads, 22 or 66, could be replaced with a pen, a scribing point, or any other suitable tool.

In Fig. 2, I have shown the device adapted for use as a beam compass for drawing purposes or for scribing purposes. In the construction shown in Fig. 2, a lug 27 is provided with a stud 28 which is received in the socket 23 and held in place by means of the set screw 26. This lug 27 is pivotally connected by means of the rivet 29 to a connecting bar 30 having the cup-shaped structure 67 on one end to provide the socket 31 into which one end of the beam 32 may be inserted. This beam 32 is secured into socket 31 by means of the set screw 33. The bar 30 is provided with a longitudinally directed, elongated slot 34, projected through which is a screw 35 which threads into the leg 12. When the screw 35 is loosened, the legs 11 and 12 may be moved relatively to each other by means of the micrometer or adjusting screw 17. When adjusted to the proper position, the tightening of the screw 35 serves to assist the micrometer or adjusting screw 17 in retaining the legs 11 and 12 in fixed relation. Thus, the bar 30 becomes a fixed brace which engages the legs between the adjusting screw 17 and the free ends of the legs. This structure is such that it provides a very rigid and durable construction so that there is no play at all between the legs 11 and 12, either toward or away from each other or laterally.

In Fig. 2, I have illustrated the construction adapted for supporting the scribe point 38 which is held by the chuck 37 on the retainer 36 through which is projected the beam 32. This retainer 36 may be moved longitudinally of the beam 32 and locked in fixed relation at any desired point by means of the screw 39 which presses downwardly to engage the beam 32. It will be noted that since the bar 30 is pivotally connected to the lug 27, the legs 11 and 12 may be moved relatively to each other in either direction within the limits of the slot 34 when the screw 35 is loosened, so that the structure is admirably adapted, either as a scribing device or drawing or marking device in the form of a beam compass.

In Fig. 3, I have illustrated a retainer 41 slidably mounted on the beam 32, the beam 32 being projected through the passage 42 formed in the retainer 41 and held in position longitudinally of the beam 32 by means of the set screw 43. Formed through the retainer or head 41 is a passage 44 into which a split end 45 of a stem 46 is inserted, this stem being hollow at its split end to receive the shank 47 of a drawing pen 48. Threaded into the head or retainer 41 is a set screw 49 whereby the split portion 45 of the stem 46 may be securely clamped against the shank 47.

Experience has shown that the structure, when arranged as shown in Fig. 2, may be rotated either by the operator gripping the member 15 or gripping the member 39 or the member 46, depending upon which part is desired to be used as a center. This eliminates the use of two hands when the beam is extended a considerable distance and the stem 46 will serve to provide additional weight at the end of the beam.

What I claim as new is:

1. In a compass of the class described comprising a pair of legs pivotally connected together adjacent one of their ends, one of said legs being longer than the other, the shorter of said legs having a socket formed in its end: a stud engaged in said socket; a set screw for engaging said stud and retaining the same in fixed relation in said socket; a lug extending outwardly from said stud; a bar; means for connecting said bar intermediate its ends pivotally to the end of said lug, said bar having an elongated slot extending longitudinally thereof inwardly from one end; a binding screw threaded into the longer of said legs and projected through said slot and adapted for binding against said bar for securing said legs in fixed relation to each other.

2. In a compass of the class described comprising a pair of legs pivotally connected together adjacent one of their ends, a threaded member threaded through said legs and adapted upon rotation for moving said legs relatively to each other, one of said legs being shorter than the other and provided with a socket in its end: a connecting member engaged in said socket; means for securing said connecting member in fixed relation to one of said legs; a lug projecting outwardly from said connecting member; a bar pivotally connected intermediate its ends on the end of said lug and having an elongated, longitudinally directed slot proceeding inwardly from one end; a set screw threaded into the longer of said legs and projected through said slot and adapted for clamping said bar for retaining said legs in fixed relation.

3. In a compass of the class described comprising a pair of legs pivotally connected together adjacent one of their ends, a threaded member threaded through said legs and adapted upon rotation for moving said legs relatively to each other, one of said legs being shorter than the other and provided with a socket in its end: a connecting member engaged in said socket; means for securing connecting member in fixed relation to one of said legs; a lug projecting outwardly from said connecting member; a bar pivotally connected intermediate its ends on the end of said lug and having an elongated, longitudinally directed slot proceeding inwardly from one end; a set screw threaded into the longer of said legs and projected through said slot and adapted for clamping said bar for retaining said legs in fixed relation; a supporting beam connected at one end to the end of said bar; a head slideably mounted on said beam; means for securing said head against slideable movement on said beam; and a working tool carried by said head.

GEORGE PENZA.

REFERENCES CITED

The following references are of record in the file of this patent:

UNITED STATES PATENTS

| Number | Name | Date |
|---|---|---|
| 78,591 | Guerrant | June 2, 1868 |
| 559,177 | Kaiser | Apr. 28, 1896 |
| 714,575 | Gove | Nov. 25, 1902 |
| 755,395 | Schoenner | Mar. 22, 1904 |
| 1,300,221 | Mooney | Apr. 8, 1919 |
| 1,580,792 | Pruss | Apr. 13, 1926 |
| 1,676,359 | Schwartz | July 10, 1928 |
| 1,676,360 | Schwartz | July 10, 1928 |
| 2,355,585 | Halstead | Aug. 8, 1944 |

FOREIGN PATENTS

| Number | Country | Date |
|---|---|---|
| 24,765 of 1895 | Great Britain | Oct. 17, 1896 |
| 178,492 | Germany | Nov. 15, 1906 |

OTHER REFERENCES

Grill (French), 2nd series, vol. 66, p. 279, Plate 40, No. 20,185, Jan. 5, 1858.